US012347231B1

(12) United States Patent
Aggarwal et al.

(10) Patent No.: US 12,347,231 B1
(45) Date of Patent: Jul. 1, 2025

(54) HEADSHOT EXTRACTION AND CURATION

(71) Applicant: Amazon Technologies, Inc., Seattle, WA (US)

(72) Inventors: Abhinav Aggarwal, New Delhi (IN); Yash Pandya, Navi Mumbai (IN); Lokesh Amarnath Ravindranathan, Bangalore (IN); Laxmi Shivaji Ahire, Malegaon (IN); Manivel Sethu, Bangalore (IN); Nihal Shandilya, Bangalore (IN); Kaustav Nandy, Bengaluru (IN)

(73) Assignee: Amazon Technologies, Inc., Seattle, WA (US)

( * ) Notice: Subject to any disclaimer, the term of this patent is extended or adjusted under 35 U.S.C. 154(b) by 429 days.

(21) Appl. No.: 17/710,679

(22) Filed: Mar. 31, 2022

(51) Int. Cl.
*G06V 40/16* (2022.01)
*G06V 10/24* (2022.01)
*G06V 10/776* (2022.01)

(52) U.S. Cl.
CPC ............ *G06V 40/172* (2022.01); *G06V 10/24* (2022.01); *G06V 10/776* (2022.01); *G06V 40/168* (2022.01)

(58) Field of Classification Search
CPC .... G06V 40/172; G06V 40/168; G06V 10/24; G06V 10/776; G06V 10/764; G06V 10/82; G06V 20/52; G06V 40/10; G06V 10/40; G06V 20/46; G06V 40/16; G06V 40/174; G06V 40/193; G06V 20/698; G06V 20/70; H04N 19/117; H04N 19/119; H04N 21/4532; H04N 21/485; H04N 9/3194; H04N 23/64; G06T 2207/20084; G06T 2207/20081; G06T 7/0002; G06T 2207/10004; G06T 2207/30196; G06T 7/80; G06T 2207/30201; G06T 2207/30244; G06T 2207/30168
See application file for complete search history.

(56) References Cited

U.S. PATENT DOCUMENTS

| 8,508,622 | B1* | 8/2013 | Anon ................... | H04N 5/2621 |
| | | | | 382/209 |
| 9,064,348 | B2* | 6/2015 | Ahn ..................... | G06V 40/164 |
| 9,449,216 | B1* | 9/2016 | Dhua ................... | G06V 40/167 |
| 10,217,029 | B1* | 2/2019 | van Rensburg ...... | G06V 40/174 |
| 2017/0286452 | A1* | 10/2017 | Gupta .................... | G06F 18/28 |
| 2018/0032840 | A1* | 2/2018 | Yu ........................ | G06V 10/774 |

* cited by examiner

*Primary Examiner* — Matthew C Bella
*Assistant Examiner* — Jinsu Hwang
(74) *Attorney, Agent, or Firm* — Eversheds Sutherland (US) LLP

(57) ABSTRACT

Systems and techniques for generation and curation of a professional headshot from a set of image data. The systems and techniques images from the set of image data based on characteristics of the representation of the individual within the image. The systems and techniques further include determining a bounding box to define a headshot, the bounding box determined based on guidelines established by heuristics and/or machine learning algorithms trained using data labeled based on heuristics.

20 Claims, 7 Drawing Sheets

HEADSHOT EXTRACTION AND CURATION

BACKGROUND

Headshots are an integral way to identify and focus on an individual in various forms of media, including digital media. Headshots may be viewed in various locations including online video platforms, photo galleries, actor profile pages, retail websites, music websites, news articles, social media, etc. While headshots are a popular medium for identifying individuals, many headshots lack consistency that may be useful for readily identifying individuals from headshots. Getting a professional headshot is an expensive and time-consuming operation. Given the high cost to obtain a professional headshot and high demand, there exists a lack of high-quality consistent headshots. As a result, many headshots are unprofessional or not useful for identifying individuals and create a sub-optimal user experience as faces in the headshots may be difficult to recognize. Provided herein are technical solutions to improve and enhance these and other systems.

BRIEF DESCRIPTION OF THE DRAWINGS

The detailed description is described with reference to the accompanying drawings. In the figures, the left-most digit(s) of a reference number identifies the figure in which the reference number first appears. The use of the same reference numbers in different figures indicates similar or identical components or features.

DETAILED DESCRIPTION

Figure 1:
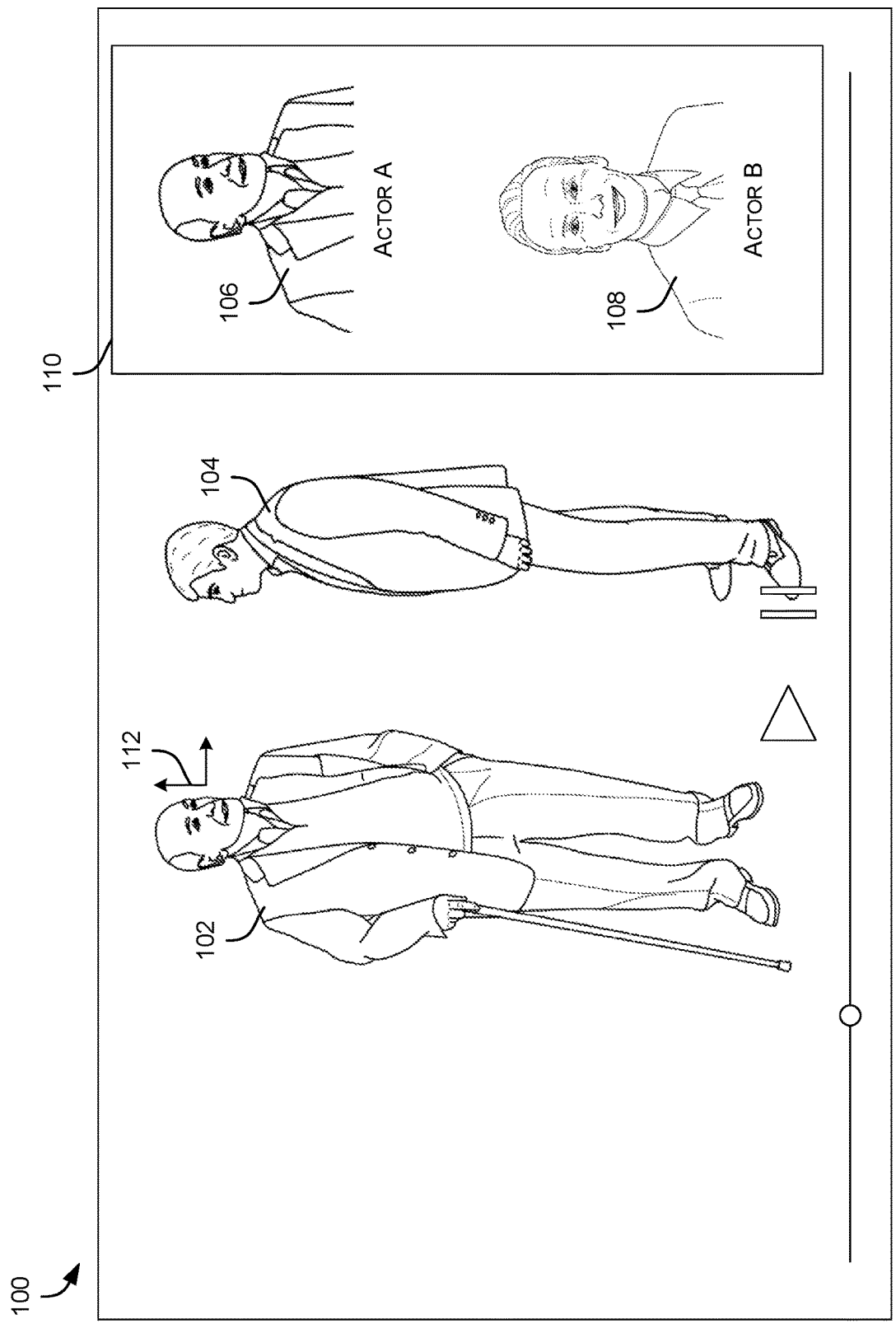
FIG. 1 illustrates an example of a frame of video data including a curated headshot and identification of the individuals within the frame using the curated headshots, according to the present description.

Described herein are, among other things, techniques, devices, and systems, for generating and curating individual headshots from accessed image data. The headshot generation process may acquire headshots for individuals using any source of image data and produce a consistent headshot view that is useful for identifying the individual and providing a consistent user experience when interacting with the headshots. The techniques and systems described herein provide a fully automated process for selection of standardized headshots for actors or other individuals using source image data. Initially, a set of face images are acquired which may be used for a headshot of the individual. The faces within the face images themselves can have diverse poses, presence of occlusions, and different expressions in addition to varying individual size (e.g., near or far from the imaging device). Various factors and/or machine learning algorithms may be used to identify source image data (e.g., face images) useful for extracting headshots for identifying an individual. After acquiring the face images, a headshot may be extracted from the selected image or images. The headshots may be extracted from the face images using various heuristics and/or machine learning algorithms. The resulting headshots provide a consistent and standardized headshot format that may be used across various platforms for the identification of individuals. Though described herein with respect to movies, films, television programs, and the like, the techniques described herein may be used to identify and extract headshots from any source image material, for example to produce employee catalogs, directories, or other such information in an efficient and consistent manner. In some examples, the headshot curation techniques may be implemented during an image gathering process, for example to provide guidance and suggestions to a photographer or device used to capture headshots with an imaging device. The suggestions may be provided at a display of the imaging device or other output device and may indicate suggested framing based on a bounding box for the individual, settings for the image sensor for brightness, sharpness, image tone, etc. The suggestions may be provided to a user of the imaging device in real-time to guide capture of a professional-styled headshot by an inexperienced user. The suggestions may include suggestions for camera settings (focus, aperture, flash, zoom, etc.), lighting suggestions, background suggestions (e.g., instructing that a background is too busy or distracting), alignment of a subject within an image frame, and other such settings. The suggestions may also include capturing image data of the surroundings and providing recommendations for backgrounds of an image, for example to guide a location and/or direction to photograph an individual based on the background. The background may, for example be identified based on not including anything that would distract from the individual. The determination may be performed using image analysis techniques, such as to identify noise, objects, or variations in pixels (e.g., variations in brightness, color, etc. within the background). Such image analysis may be performed by an on-board computing device and may be implemented using one or more machine learning techniques.

The headshot curation systems and techniques provide several benefits over existing systems and techniques. For example, the consistent format and layout of the curated headshots provide for an improved user experience. In an illustrative example, in some existing systems, headshots may come from a variety of sources and have a variety of formats (full body, half-body, head only, varying image angles, etc.) that may cause difficulty for a user to identify the individual from their headshots. Additionally, on various user devices having screens of different sizes, a full-body headshot photo may render the face (a primary source of individual recognition) too small for a user to view and distinguish features of the individual for identification. The curated headshots resolve this inconsistency by resulting in a standardized format and layout for the headshots that feature the face of the individual for identification.

The headshot curation systems and techniques also improve efficiency, speed, and capability for headshot generation and identification for individuals. In another illustrative example, a particular movie may include any number of individuals having various roles and titles, some of which may have provided a headshot for use in association with the movie. However, some individuals may not have provided a headshot, or may not have a headshot in a particular database of headshots for individuals that may be used in marketing, promotion, informational materials, and the like. The headshot curation systems and techniques may generate the standardized headshots described above in addition to populating or generating headshots from raw source data (e.g., the frames of the movie). In this manner, the headshot curation systems and techniques may identify images including an individual, identify a subset of images suitable for headshot generation based on factors such as pose, sharpness, and brightness. The headshot curation system may then identify a bounding box for a headshot within the subset of the image data and extract a headshot for the individual from the image source. In addition to generating new headshots for individuals who may not have one associated with them, the systems and techniques may provide contextually applicable headshots. The contextually applicable headshots may show a headshot of the individual in the context of the source material. For movies or other source material this may aid a user in identifying individuals and characters more easily as their headshots may correspond to the on-screen appearance of the individual.

In an illustrative example, to extract a headshot from a source of one or more images, the techniques herein initially localize an individual within the images using a face detection algorithm. The face detection algorithm may include any suitable machine learning model trained using labeled faces either to identify particular identities and/or to identify a face within an image that may be identified at a later stage. The images may be selected based on identification of faces and identification of poses and/or other characteristics that lead to a successful headshot. Such characteristics include the entire face of the individual being visible, having a brightness and sharpness above a threshold level, and other such factors that result in clearly visible faces of individuals. After identifying the individual or presence of the individual within the images, the images may have optional characteristics adjusted, for example to change an image tone, brightness, background blur, alignment of the individual with a vertical axis, and/or sharpness to improve the resulting headshot. After identifying the images and detecting the faces within the images, the headshots may be extracted by defining a bounding box around the face and/or head of the user. The bounding box may be established using heuristics and/or a trained machine learning model. The heuristics may define features of the resulting headshot cropped by the bounding box. In some instances, the heuristics may include identifying a face within an upper half or upper third of the headshot image: centering the face of the individual: cropping all or a portion of the hair of the individual; and including an upper portion of the shoulders of the individual. The resulting bounding box, defined using the parameters defined above, may then be used to crop the image to produce the resulting headshot. The headshot may then be associated with an individual's identity, the source material (e.g., movie), or other materials in one or more storage locations. The headshots may then be recalled by a user who accesses the movie, image information, or material produced using the generated headshot.

Having now discussed examples of the systems and methods described herein, FIG. 1 illustrates an example of a frame 100 of video data including a curated headshot and identification of the individuals within the frame using the curated headshots, according to the present description. A headshot is a type of portrait that is typically a tightly cropped photo of the face, from the shoulders up. The subject is camera aware (e.g., the subject is typically looking right in the lens). The headshot may be used for marketing, individual identification, hiring, casting, and other such purposes. The frame 100 may be a still image of a set of images defining a video. In some examples, the frame 100 may also be an image from a set of images, such as a gallery of images on a user device captured by a camera of the user device, or other gallery of images. The frame 100 may also be an example of a single still image that serves as a source of image data for headshot curation for at least one of the individuals 102, 104. The individuals 102, 104 are pictured within the frame 100 while an informational pane 110 includes information about each individual visible within the frame 100. The informational pane includes a first headshot 106 and a second headshot 108, the first headshot 106 and the second headshot 108 showing the faces of the individuals 102, 104.

The headshot curation system and techniques described herein may extract the first headshot 106 and/or the second headshot 108 from the frame 100. The headshot is extracted from the frame by first identifying individuals within the frame 100 using a face recognition algorithm or other technique or system used for facial recognition and/or identification. The identified faces of the individuals are then surrounded by a bounding box used to determine a crop within the frame 100 that will result in a headshot for each individual. The bounding box for each headshot may be determined based on defined heuristics that determine dimensions and/or ratios for the bounding box as a function of the dimensions of the facial features or other features of the individual. For example, the bounding box may be defined based on a height of the face of the individual, such as first identifying shoulders and hair or top of the head of the individual and defining the height of the bounding box to crop tightly around the head and shoulders of the individual. The width may be determined based on maintaining a consistent width to height ratio of the headshot. For example, the bounding box may be established using a predetermined aspect ratio such as 1:1 of the width to the height of the headshot. In some examples, the bounding box is instead defined using a trained machine learning algorithm such as such as a Multi-Task Cascaded Convolutional Neural Network (MTCNN). The MTCNN performs several cascaded steps to identify the face within the frame 100 and then identify a bounding box that surrounds the identified face. In some examples, the bounding box may be determined using one or more other machine learning algorithms. For example, other face detection solutions and machine learning algorithms trained to identify a bounding box using labeled headshot data may be implemented.

The MTCNN includes at least three convolutional neural networks to perform facial recognition within the frame 100. In a first stage, the MTCNN creates an image pyramid to detect faces of all different sizes within the frame 100. Different copies of the frame 100 in different sizes are created from the single frame 100 in order to search for faces of varying sizes within the frame 100. For each of the scaled copies of the frame, the first stage scans the frame for faces using a kernel to shift across the entire area of each scaled image searching for faces. Candidate faces are extracted and identified within the frame 100 using the first stage.

In a second stage, the MTCNN identifies faces that are out of frame or obscured. For portions of the boxes around candidate faces not corresponding to the face of an individual (e.g., out of bounds or covered by an obstruction), pixel values are set to zero. The result of the second stage is coordinates of new, more accurate bounding boxes around the candidate faces within the frame 100. Each bounding box has an associated confidence score, with bounding boxes having low confidence scores rejected as candidates.

In a third stage of the MTCNN, the outputs identify coordinates of the bounding boxes around the faces, coordinates for one or more facial landmarks (eyes, nose, mouth, chin, shoulders, hairline, etc.), and a confidence score for each of the bounding boxes. The final bounding boxes are tightly cropped around the faces of the individuals within the frame 100. In some examples, the final bounding boxes may be further adjusted based on one or more additional cascaded layers, such as layers to expand the tightly cropped bounding box to include the shoulders and hairline of the individuals before cropping according to or based at least in part on the bounding boxes.

As illustrated, individual 102 is identified by first headshot 106 extracted from the frame 100. To extract the headshot, the individual 102 is identified within the frame 100. The frame 100 is also evaluated for suitability to extract a headshot. The evaluation includes determining brightness levels, sharpness levels, contrast levels, and other image characteristics of the frame 100 to ensure that the individual 102 is clearly visible within the frame 100 before using the frame to extract the first headshot 106.

The frame 100 is also evaluated based on the pose of the individual 102. The individual 102 is turned facing towards the imaging device that captured frame 100 while individual 104 is turned sideways so only a profile view of individual 104 is visible in the frame 100. For this reason, the headshot curation system may only select frame 100 for extraction of a headshot for individual 102 and not for individual 104. Similarly, the frame 100 may be rejected for extraction of a headshot of one or more of individuals 102 or 104 in the event that either is obscured, crowded closely by additional characters, or otherwise not fully visible or distinguishable from surroundings. In such examples, the source of image data may be evaluated to identify additional frames or sources for generating a headshot of individual 104.

The evaluation of the frame 100 may include confidence scores for each of the cascaded layers of the MTCNN. The confidence scores may reflect metrics corresponding to the presence of an entire face of an individual, a metric describing the pose of the face of the individual (e.g., such as describing a pose angle relative to an image capture device that captured the frame), image quality for the faces within the images (e.g., is the individual in a foreground or background of the frame 100), etc. These metrics may be used to identify a frame 100 suitable for facial recognition and extraction and may also be used for rejecting bounding boxes identified at different stages of the MTCNN in response to their confidence scores being lower than a threshold amount.

The various parameters and characteristics of the frame 100 and the position and/or orientation of the individuals 102, 104 within the frame 100 may be evaluated using heuristics defining absolute rules to identify a frame 100 for headshot extraction. For example, the brightness, sharpness, and pose of the individuals may be provided with an absolute value that is compared against a threshold. The brightness and sharpness levels may be absolute values for those characteristics compared against thresholds. The pose of the individual may be scored based on one or more angles of the pose of the individual. For instance, a pose of the face of individual 102 may be evaluated based on the direction the face is pointing, against coordinate system 112. The direction may include multiple angles, e.g., a first angle describing a direction with respect to a first axis of coordinate system 112 and a second angle describing a second direction with respect to a second axis of coordinate system 112. The pose angles may be compared against thresholds to ensure the face of individual 102 is visible, with the thresholds establishing a range of acceptable angles. In some examples the ranges of angles may include fifteen to sixty-degree ranges for the pose in either direction of coordinate system 112 such that the pose when looking directly at the imaging device (e.g., perpendicular to the plane of FIG. 1), is at zero degrees along both axes and acceptable ranges may be within fifteen to sixty degrees of zero in either direction. In some examples other narrower or wider thresholds may be established based on the requirements for visibility of the face of individual 102. As illustrated, the pose of individual 104 is outside of the pose range, therefore frame 100 is not suitable for headshot extraction for individual 104 and a different frame or image source should be selected for the second headshot 108.

In some examples, the frame 100 may be selected for headshot extraction based on a cost function that balances costs for head pose, head size, and other factors of the image, such as image quality, tone, etc. The cost function may be evaluated for a set of images to identify a single candidate image for headshot extraction. The cost function may weight the ideal pose of the head (facing the camera), the image qualities and/or characteristics, the size of the head within the image, and other such factors to select the candidate images.

In some examples, the frame selection determination and identification of the user within the frame may be performed by a machine learning model trained using data labeled with information such as the characteristics described above. In such examples, the machine learning model may evaluate a set of images or series of frames to identify a subset of the frames suitable for headshot extraction. The machine learning model may include one or more models that evaluate one or more metrics for the images and generates a score for each frame and/or each identified face within the images, the score indicative of the suitability for a headshot based on the metrics. In an example, the training data for the model includes images tagged with labels associated with the metrics described herein. For example, the training data may describe metrics such as a metric describing the pose of the face of the individual (e.g., such as describing a pose angle relative to an image capture device that captured the frame), image quality for the faces within the images (e.g., is the individual in a foreground or background of the frame 100), metrics for brightness, image tone, etc. The model may then generate scores for each image or face within a set of images, the images and faces having scores exceeding a threshold amount being selected for generation of headshots. Accordingly, the input to the model is a set of image data and/or image data with recognized faces tagged, and the output being scores for each image and/or recognized face reflecting the suitability for headshot extraction.

Following identification of frame 100 for headshot extraction, the headshot curation system defines a bounding box to crop the first headshot 106. The bounding box may be defined by heuristics in some examples. The heuristics may define features of the resulting headshot cropped by the bounding box. In some instances, the heuristics may include identifying a face within an upper half or upper third of the headshot image: centering the face of the individual: cropping all or a portion of the hair of the individual; and including an upper portion of the shoulders of the individual. The resulting bounding box, defined using the parameters defined above, may then be used to crop the image to produce the resulting headshot. In some examples, the bounding box may be defined using a machine learning model, such as a Multi-Task Cascaded Convolutional Neural Network (MTCNN). An example of the MTCNN that may be used for defining the bounding box is described in Zhang, K., Zhang, Z., Li, Z., & Qiao, Y. (2016). Joint face detection and alignment using multitask cascaded convolutional networks. *IEEE Signal Processing Letters*, 23 (10), 1499-1503. https://doi.org/10.1109/lsp.2016.2603342. The MTCNN includes at least three convolutional neural networks to perform facial recognition within the frame 100. In a first stage, the MTCNN creates an image pyramid to detect faces of all different sizes within the frame 100. Different copies of the frame 100 in different sizes are created from the single frame 100 in order to search for faces of varying sizes within the frame 100. For each of the scaled copies of the frame, the first stage scans the frame for faces using a kernel to shift across the entire area of each scaled image searching for faces. Candidate faces are extracted and identified within the frame 100 using the first stage.

In a second stage, the MTCNN identifies faces that are out of frame or obscured. For portions of the boxes around candidate faces not corresponding to the face of an individual (e.g., out of bounds or covered by an obstruction), pixel values are set to zero. The result of the second stage is coordinates of new; more accurate bounding boxes around the candidate faces within the frame 100. Each bounding box has an associated confidence score, with bounding boxes having low confidence scores rejected as candidates.

In a third stage of the MTCNN, the outputs identify coordinates of the bounding boxes around the faces, coordinates for one or more facial landmarks (eyes, nose, mouth, chin, shoulders, hairline, etc.), and a confidence score for each of the bounding boxes. The final bounding boxes are tightly cropped around the faces of the individuals within the frame 100. In some examples, the final bounding boxes may be further adjusted based on one or more additional cascaded layers, such as layers to expand the tightly cropped bounding box to include the shoulders and hairline of the individuals before cropping according to or based at least in part on the bounding boxes.

The bounding box may be used to determine a crop for the headshot, and following cropping, one or more aesthetic corrections may be performed on the headshot to adjust an alignment, image tone, brightness, or other image characteristics. The cropping is performed using the input of the bounding box defined by the MTCNN and is performed by providing the bounding box location and dimensions as well as the source image to a cropping tool to remove image data outside of the bounding box location. The aesthetic characteristics to adjust may be identified in a manner similar to described above with respect to the frame selection process, by evaluating characteristics based on thresholds of brightness, tone, sharpness, alignment, and other such characteristics. The aesthetic characteristics may be evaluated by generating an aesthetic score, or multiple scores, indicative of one or more appearance characteristics of the image. For example, the brightness, sharpness, and image tone may all be evaluated to produce one or more aesthetic or appearance scores for the image indicative of a brightness, clarity, visibility, or other characteristics of the image. In some examples, one or more adjustments may be made in response to the one or more aesthetic scores being below a threshold. For example, in response to determining that a brightness or sharpness of the image is below a threshold one or more adjustments are made to one or more image characteristics to improve the score to at or above the threshold. The brightness and sharpness levels, or other characteristics may be absolute values for those characteristics compared against thresholds.

The aesthetic and/or appearance adjustments may be performed by adjusting one or more aesthetic parameters, re-evaluating one or more aesthetic or appearance scores, and continuing to adjust one or more parameters until the aesthetic score exceeds a predetermined threshold. A first appearance score, which may include one or more scores related to different aesthetics such as brightness, clarity, visibility, image quality, image tone, etc., may be generated to reflect the aesthetic quality of the image. In response to the first appearance score being below a threshold, one or more of the aesthetic factors may be adjusted. In an illustrative example, an image may receive a first appearance score with individual scores for different characteristics. An aggregate score computed based on an aggregation of the scores for each characteristic may be below a threshold score. The brightness may be the selected characteristic to adjust based on the specific brightness score being lower than a threshold and/or lower than other characteristic scores that are used to make up the appearance score. In response, a brightness for the image may be adjusted before re-evaluating the appearance score. After adjusting the image brightness, the characteristic and appearance scores are re-calculated. The process may be continued iteratively until the appearance score is at or above the predetermined threshold.

Following the headshot generation, the first headshot 106 may be associated with the individual 102 and the frame 100 as well as the source of the frame 100. In this manner, references to the individual 102, frame 100, or frame source (e.g., movie) may recall the first headshot 106 for identifying the individual as associated with the items.

In an illustrative example, the frame 100 is a single frame of a set of frames making up a video when arranged and played sequentially. The frame 100 is therefore a single stationary image. The frame 100 may be displayed on a display device of a computing device as a user is watching a video. The user may pause the video to show the frame 100. For example, the user may be pausing the video to attempt to ascertain the identities of the actors within the frame 100. When the video is paused, the user may have access to an informational pane 110 where information related to the video, the frame 100, and/or the individuals 102 and 104 such as the identities of the individuals 102 and 104 as well as selected headshots for each. The headshots 106 and 108 may be accessed from a database of headshots associated with the video and may include headshots extracted from the video data or headshots from third-party sources.

When generating headshots, the frame 100 may be used to extract a headshot for one or more of the individuals 102 and 104. In the frame 100, the individual 102 and the individual 104 are shown facing one another while in a conversation. The individual 104 is not facing the camera and therefore their entire face is not visible in the frame 100. In the example, a headshot extraction system may evaluate the frame 100 among other frames of the video, for suitability for headshot extraction. When the headshot extraction system evaluates the frame 100, the partial obstruction of the face of individual 104 may result in the frame 100 being rejected at least for extraction of a headshot for individual 104. However, the same evaluation may identify the frame 100 as suitable for extraction of a headshot for individual 102 based on characteristics of the image. The characteristics are identified as the visibility of the face (as recognized by a facial recognition algorithm), the image quality of the frame (especially at the location of the identified face), the brightness of the image at the location of the face, and other such characteristics. Using the techniques described herein, the headshot 106 may be extracted from the frame 100 and associated with the frame 100 and/or video for access and use by a user while viewing the video.

Figure 2A:
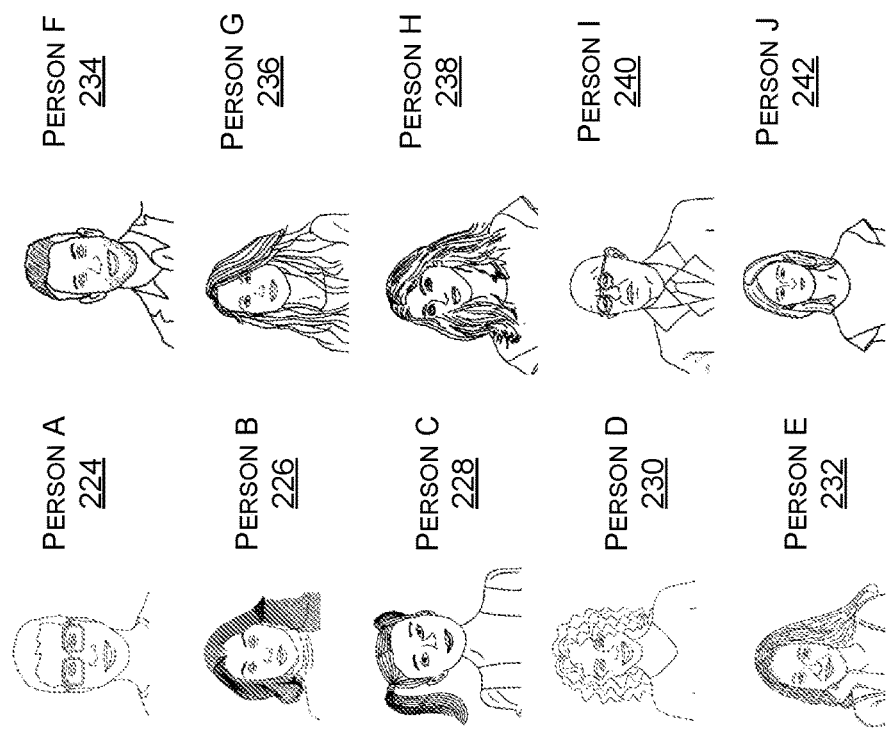
FIG. 2A illustrates an example of a typical representation of a list of persons using varied headshots.

FIG. 2A illustrates an example of a typical representation of a cast 200 of persons using varied headshots. In the cast 200, a list of persons 202-220 involved or associated with a particular project or group is shown. The list of persons 202-220 includes headshots or images of the individuals. The headshots have varying style, focus, crop, and scope that may cause confusion or difficulty in visually identifying the individuals. For example, the face of persons 202, 204, and 208 are clearly visible while others may not be as clear to a user for a variety of reasons. In the example, person 220 is illustrated having two individuals which may lead to confusion as to the identity of the person 220. Additionally, various images show a larger portion or entirety of the body of persons 206, 210, 212, 214, 216, 218, and 220 than is visible for person 202. As such, the faces of those individuals may be harder to discern and identify. The headshot curation system may use the images of the cast 200 to produce the cast 222 shown in FIG. 2B with increased focus on the faces and identifiable features of the individuals while providing a consistent headshot style to reduce friction for users and improve an aesthetic appearance of the cast listing.

Figure 2B:
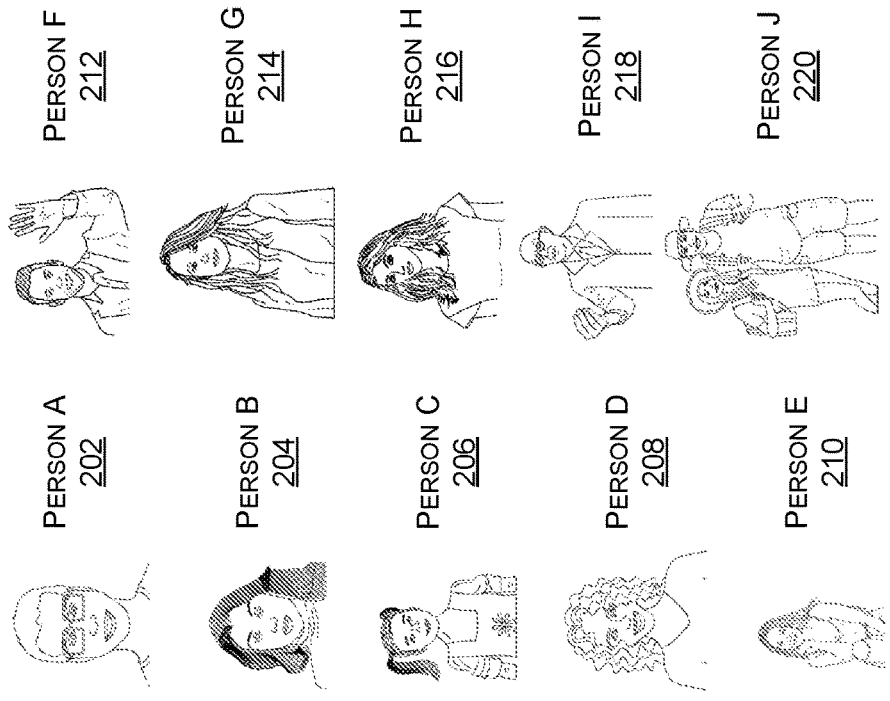
FIG. 2B illustrates an example of a representation of a list of persons generated using curated headshots to provide a set of consistent headshots for identification, according to the present description.

FIG. 2B illustrates an example of a representation of a cast 222 of persons generated using curated headshots to provide a set of consistent headshots for identification, according to the present description. In the cast 222, the headshots have been adjusted to focus the headshots on a consistent view of the persons 224-242. For persons 224, 226, and 230, the headshot may be substantially the same or identical to that shown in FIG. 2A. For others, including persons 228, 232, 234, 236, 238, and 240, the headshots in the cast 222 are cropped using the bounding box procedure described herein. In this manner, the head, faces, and shoulders of the individuals are visible and featured for identification. In some examples, such as with person 220, the inclusion of the second individual in the headshot of cast 200 may prevent a consistent and useful headshot from being generated. In such examples, the headshot curation system may access a source of images to identify a secondary headshot, visible for person 242 and clearly identifying the individual in a consistent manner with the additional headshots of cast 222.

Figure 3:
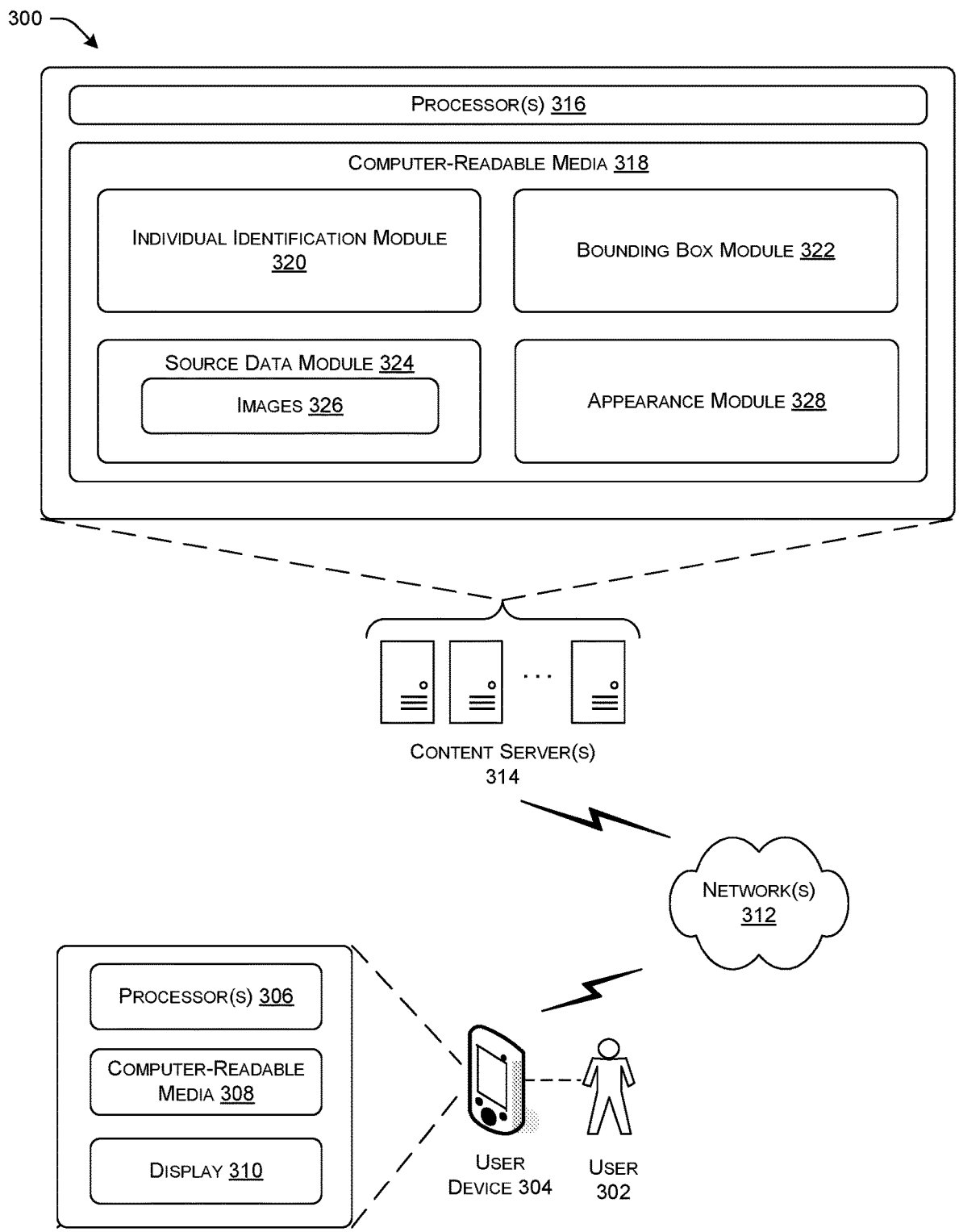
FIG. 3 illustrates an example environment for generating and providing curated headshots for individual identification, according to the present description.

FIG. 3 illustrates an example system 300 for generating and providing curated headshots for individual identification, according to the present description. More particularly, the example system 300 may be used to generate and extract headshots from image data as well as provide the headshots for access by a user 302 via a user device 304. The curated headshots may be extracted as described herein using the systems and modules of FIG. 3. Though FIG. 3 is shown having particular modules and elements, other modules, components, or elements may be used to accomplish the techniques associated therewith. The elements of the example system 300 illustrate an example environment for generating curated headshots and interacting with those headshots, such as providing to a user 302 for viewing and consumption.

As shown in FIG. 3, the example system 300 may include one or more users 302, one or more user devices 304 associated with the users 302, one or more network(s) 312, and one or more content server 314. In various embodiments, the user 302 may operate the user device 304, which may include one or more processor(s) 306, computer-readable media 308 and a display 310. The content server 314 may also include one or more processor(s) 316 and computer-readable media 318, which may include an individual identification module 320, a bounding box module 322, and a source data module 324.

In various embodiments, the content server 314 may be a service provider, a video hosting service, or any number of servers or entities that may provide products, services, promotions, articles, advertisements, and/or other media to consumers.

In some embodiments, the user 302 may operate the user device 304 to perform various functions associated with the user device 304, which may include the one or more processor(s) 306, the computer-readable media 308, and the display 310. Furthermore, the user 302 may utilize the user device 304 to interact with a video, image, article, or other media, to interact with the content server 314, such as via a website or an application associated with a user device 304.

In some embodiments, the user device 304 may be any type of device that is capable of receiving, accessing, searching data and displaying data to the user 302. For instance, the user device 304 may include a personal computer, a laptop computer, a cellular telephone, a PDA, a tablet device, an electronic book (e-Book) reader device, or any other device that may be used to view image data or to access a platform (e.g., website, application, etc.) associated with the content server 314. The user device 304 shown in FIG. 3 is only one example of a user device 304 and is not intended to suggest any limitation as to the scope of use or functionality of any user device 304 utilized to perform the processes and/or procedures described herein.

The processor(s) 306 of the user device 304 may execute one or more modules and/or processes to cause the user device 304 to perform a variety of functions, as set forth above and explained in further detail in the following disclosure. In some embodiments, the processor(s) 306 may include a central processing unit (CPU), a graphics processing unit (GPU), both CPU and GPU, or other processing units or components known in the art. Additionally, each of the processor(s) 306 may possess its own local memory, which also may store program modules, program data, and/or one or more operating systems.

In at least one configuration, the computer-readable media 308 of the user device 304 may include any components that may be used to receive, access, or view images and headshots provided by the content server 314. Depending on the exact configuration and type of the user device 304, the computer-readable media 308 may also include volatile memory (such as RAM), non-volatile memory (such as ROM, flash memory, miniature hard drive, memory card, or the like), or some combination thereof. In some examples, the user device 304 may include modules similar or identical to the individual identification module 320, bounding box module 322, source data module 324, and/or appearance module 328. The user device 304 may use the modules to perform the methods described herein without the need to access the content server 314. For example, the user device 304 may use the modules described herein to extract headshots from images of individuals included in a group of photos taken by an imaging device of the user device 304 (e.g. a camera roll or the user device 304).

In various embodiments, the user device 304 may also have input device(s) such as a keyboard, a mouse, a pen, a voice input device, a touch input device, etc. The user device 304 may also include the display 310 and other output device(s), such as speakers, a printer, etc. The user 302 may utilize the foregoing features to interact with the user device 304 and/or the content server 314 via the network(s) 312. More particularly, the display 310 of the user device 304 may include any type of display 310 known in the art that is configured to present (e.g., display) information to the user 302.

In some embodiments, the network(s) 312 may be any type of network known in the art, such as the Internet. Moreover, the user device 304 and the content server 314 may communicatively couple to the network(s) 312 in any manner, such as by a wired or wireless connection. The network(s) 312 may also facilitate communication between the user device 304 and the content server 314. For instance, the content server 314 may provide the one or images, videos, headshots, metadata, or other information to user devices 304 via the network(s) 312.

In addition, and as mentioned previously, the content server 314 may include the one or more processor(s) 316 and the computer-readable media 318. The content server 314 may also include additional components not listed above that may perform any function associated with the content server 314. In various embodiments, the content server 314 may be any type of server, such as a network-accessible server, and may be one of multiple servers included in a server cluster or server farm. In other embodiments, the processor(s) 316 and the computer-readable media 318 of the content server 314 may be the same as, similar to, or different from the processor(s) 306 and the computer-readable media 308, respectively, of the user device 304.

The source data module 324 may maintain or be associated with one or more images 326 (including sequences of images such as videos). The source data module 324 may include one or more databases or access to one or more databases including images 326 that may include sequence of images, individual images, and other such data. In some examples, the images 326 may include images of existing headshots associated with individuals that may be used for further headshot generation, such as described with respect to FIG. 2B above.

The individual identification module 320 may include one or more components for identifying individuals within the source data provided by the source data module 324. The individual identification module 320 may perform specific and generic identification of individuals. Specific identification of individuals may include identification of identities of particular individuals within the images. Generic identification may include identification of a presence of an individual within a particular image. The individual identification module may include one or more machine learning models to identify a particular identity or presence of an individual within the images 326. For example, the MTCNN may be used to identify a presence of individuals within the images 326. The individual identification module 320 may also be used to perform an image quality determination indicative of a quality of the image for extracting a headshot of an individual.

The individual identification module 320 may initially localize an individual within the images using a face detection algorithm. For example, several suitable face detection algorithms are available on the market, including the FACE-VACS® software by Cognitec Systems GmbH, FaceSDK™ offered by Luxand, Inc., and FaceRecognizer™ by OpenCV. The individual identification module 320 may include any suitable machine learning model trained using labeled faces either to identify particular identities and/or to identify a face within an image that may be identified at a later stage. The images may be selected by the individual identification module 320 based on identification of faces and identification of poses and/or other characteristics that lead to a successful headshot. Such characteristics include the entire face of the individual being visible, having a brightness and sharpness above a threshold level, and other such factors that result in clearly visible faces of individuals.

The individual identification module 320 may evaluate the images 326, for example, as described with respect to frame 100 at FIG. 1. The individual identification module 320 may evaluate the images based on the pose of the individual being suitable for extraction of a headshot (e.g., the individual is facing such that their entire face is visible). Similarly, the images 326 may be rejected for extraction of a headshot of one or more of individuals in the event that an individual is obscured, crowded closely by additional characters, or otherwise not fully visible or distinguishable from surroundings. In such examples, the images 326 may be further evaluated to identify additional images or sources for generating a headshot of an individual.

The bounding box module 322 may determine a bounding box for cropping the images 326 to generate a headshot. The bounding box may be established using heuristics and/or a trained machine learning model. The heuristics may define features of the resulting headshot cropped by the bounding box. In some instances, the heuristics may include identifying a face within an upper half or upper third of the headshot image: centering the face of the individual: cropping all or a portion of the hair of the individual; and including an upper portion of the shoulders of the individual. The resulting bounding box, defined using the parameters defined above, may then be used to crop the image to produce the resulting headshot. In some examples, the bounding box may be defined using a machine learning model, such as the MTCNN.

The appearance module 328 may perform one or more aesthetic and/or appearance adjustments to the headshot and/or the images 326 either before or after extraction of the headshot using the bounding box described herein. The appearance module 328 may generate an aesthetic score, or multiple scores, indicative of one or more appearance characteristics of the image, such as the resulting headshot. For example, the brightness, sharpness, and image tone may all be evaluated by the appearance module 328 to produce one or more aesthetic or appearance scores for the headshot indicative of a brightness, clarity, visibility, or other characteristics of the headshot. The appearance module 328 may additionally perform one or more adjustments in response to the one or more aesthetic scores being below a threshold. For example, in response to determining that a brightness or sharpness of the headshot is below a threshold, the appearance module 328 may perform an adjustment to one or more image characteristics to improve the score to at or above the threshold. The brightness and sharpness levels may be absolute values for those characteristics compared against thresholds.

In some examples, the aesthetic and/or appearance adjustments may be performed in an iterative manner, by adjusting one or more aesthetic parameters, re-evaluating one or more aesthetic or appearance scores, and continuing to adjust one or more parameters until the aesthetic score exceeds a predetermined threshold. The appearance module 328 may evaluate a first appearance score, which may include one or more scores related to different aesthetics such as brightness, clarity, visibility, image quality, image tone, etc. In response to the first appearance score being below a threshold, one or more of the aesthetic factors may be adjusted before re-evaluating. In an illustrative example, an image may receive a first appearance score with individual scores for different characteristics. An aggregate score computed based on an aggregation of the scores for each characteristic may be below a threshold score. In response, a brightness for the image may be adjusted before re-evaluating the appearance score. The brightness may be the selected characteristic to adjust based on the specific brightness score being lower than a threshold and/or lower than other characteristic scores that are used to make up the appearance score. After adjusting the image brightness, the characteristic and appearance scores are re-calculated. The process may be continued iteratively until the appearance score is at or above the predetermined threshold.

Figure 4:
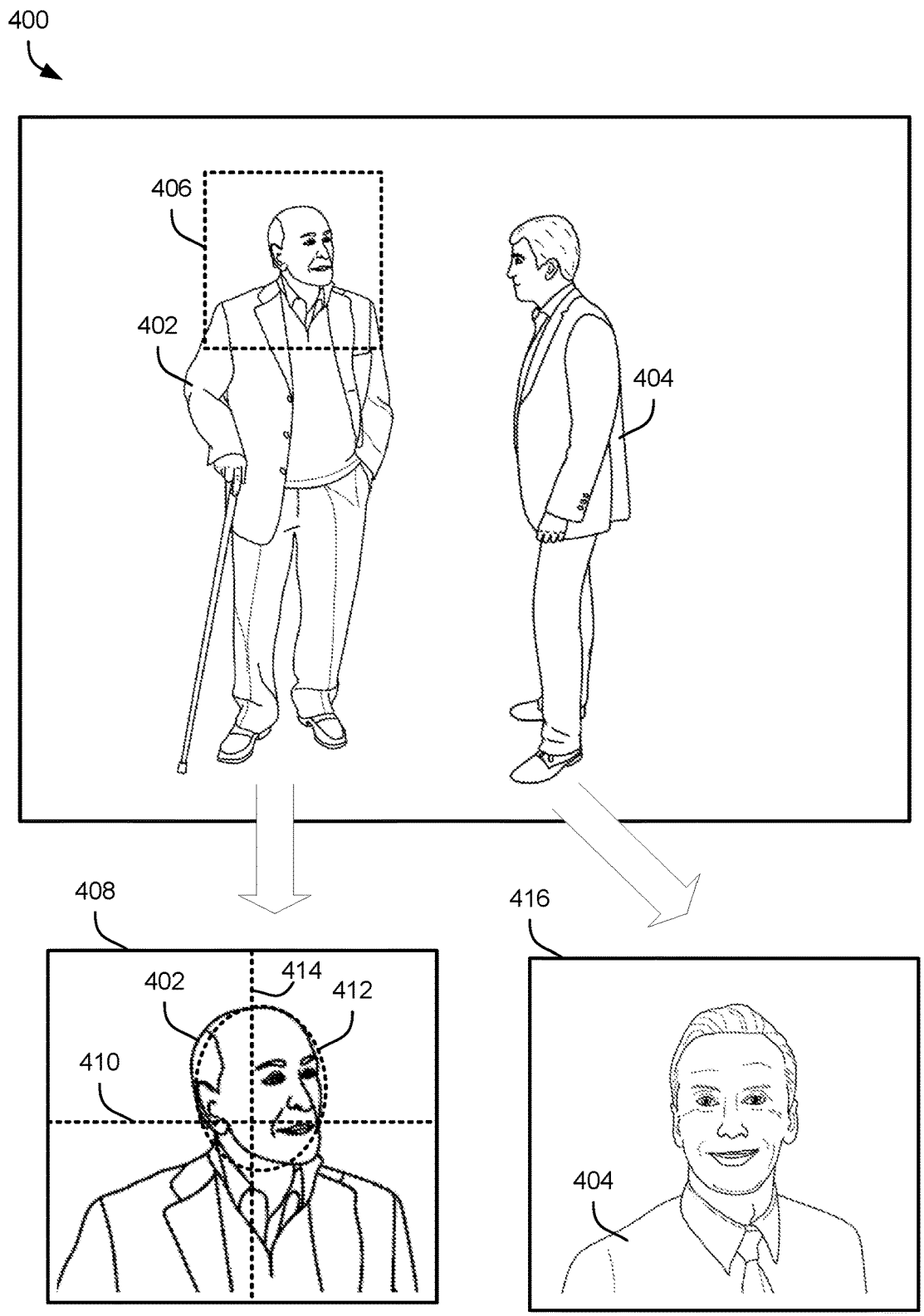
FIG. 4 illustrates an example illustration of headshot curation using image data and heuristic parameters, according to the present description.

FIG. 4 illustrates an example illustration of headshot curation using image data and heuristic parameters, according to the present description. The illustration includes an image 400 including a first individual 402 and a second individual 404. The image 400 may be used to extract one or more headshots for the individuals. As described above, the image 400 may be evaluated for suitability to extract a headshot for each of the individuals. Following the evaluation, a headshot may be extracted as shown in FIG. 4.

With reference to the first individual 402, the image 400 may be determined to be suitable for headshot extraction. Following the determination, a bounding box 406 may be defined around the face of the first individual 402. The face may be identified by a face detection algorithm described herein. The bounding box 406 may be defined by heuristics in some examples. The heuristics may define features of the resulting headshot 408 cropped by the bounding box. In some instances, the heuristics may include identifying a face within an upper half, as defined by guideline 410 or upper third of the headshot image: centering the face of the individual (e.g., using a face detection 412), according to centerline 414: cropping all or a portion of the hair of the individual (not shown); and including an upper portion of the shoulders of the individual. The upper and lower limits of the bounding box 406 may be established based on the dimensions of the image from the shoulders to the top of the head of the individual. The left and right limits of the bounding box 406 may be defined based on maintaining a particular aspect ratio to the headshot or based on ensuring the shoulders are visible within the headshot or other factors. The resulting bounding box 406, defined using the parameters defined above, may then be used to crop the image to produce the resulting headshot. In some examples, the bounding box may be defined using a machine learning model, such as the MTCNN. After the dimensions and location of the bounding box 406 within the image 400 are established, the image 400 may be cropped accordingly to produce a headshot. In some examples, a headshot 416 for the second individual 404 may be extracted from a separate source and associated with image 400 for later use and reference.

Figure 5:
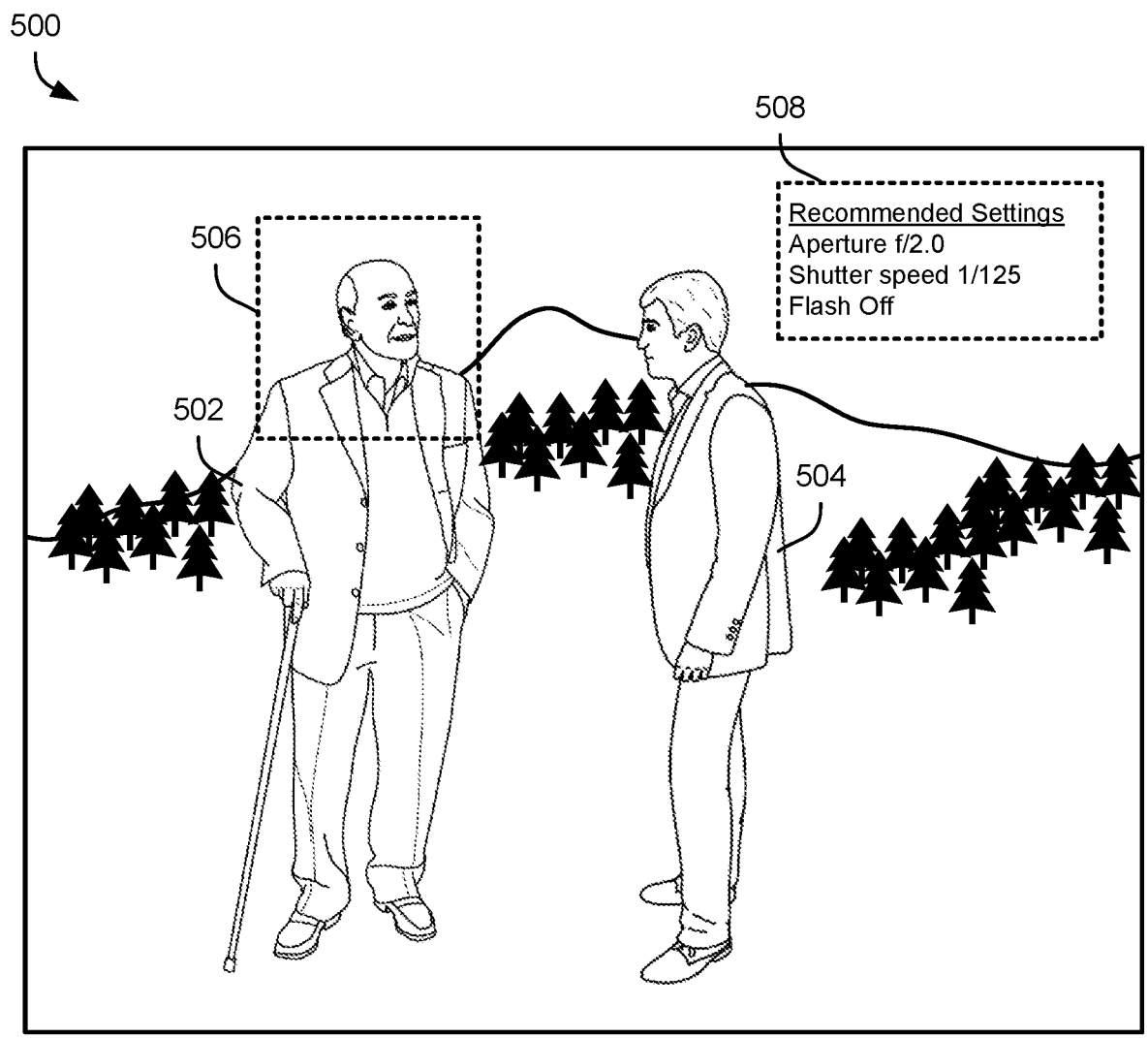
FIG. 5 illustrates an example illustration of headshot capture guidance using an imaging device equipped with a suggestion module, according to the present description.

FIG. 5 illustrates an example illustration of headshot capture guidance using an imaging device equipped with a suggestion module, according to the present description. The illustration includes an image 500 including a first individual 502 and a second individual 504. The image 500 may be illustrative of a real-time view of a viewfinder for an imaging device used to capture images and/or an image captured by an imaging device. The image 500 may be used as a source of a headshot, either by guiding the user of the imaging device to capture a professionally-styled headshot using guidance from the imaging device and/or to extract a headshot from an image previously captured on the imaging device.

In some examples, the imaging device may be equipped with one or more of the modules shown and described in FIG. 3, that may be used to define a bounding box 506 around the first individual 502 for guidance of an area to focus and zoom in on based on the headshot curation parameters described herein. Though the processes described herein may be performed on previously captured images, as described herein, the processes may be used to guide a user in capturing headshots in real-time by providing suggestions for the region of the viewfinder to zoom or reposition to capture, as well as camera settings. The bounding box 506 may be identified as described herein and identified within the viewfinder or preview display of the imaging device. The user may then zoom, focus, and/or reposition the imaging device to capture an image that closely crops fits the bounding box 506. Additionally, settings for the camera may be suggested by the device to adjust the brightness, contrast, sharpness, depth of field, and other settings, such as the aesthetic settings and appearance features described herein. The recommended settings 508 may be displayed for the user to view and adjust manually or may be automatically adjusted on the imaging device.

The recommended settings 508, or other annotations may also include annotations to guide a user in capturing an image with a particular background or lighting environment. In such examples capturing image data of the surroundings and providing recommendations for backgrounds of an image or for better lighting within the image, for example to guide a location and/or direction to photograph an individual based on the background and/or to avoid the camera pointing at a bright source of light. The background may, for example be identified based on not including anything that would distract from the individual. The determination may be performed using image analysis techniques, such as to identify noise, objects, or variations in pixels (e.g., variations in brightness, color, etc. within the background). Such image analysis may be performed by an on-board computing device and may be implemented using one or more machine learning techniques.

Figure 6:
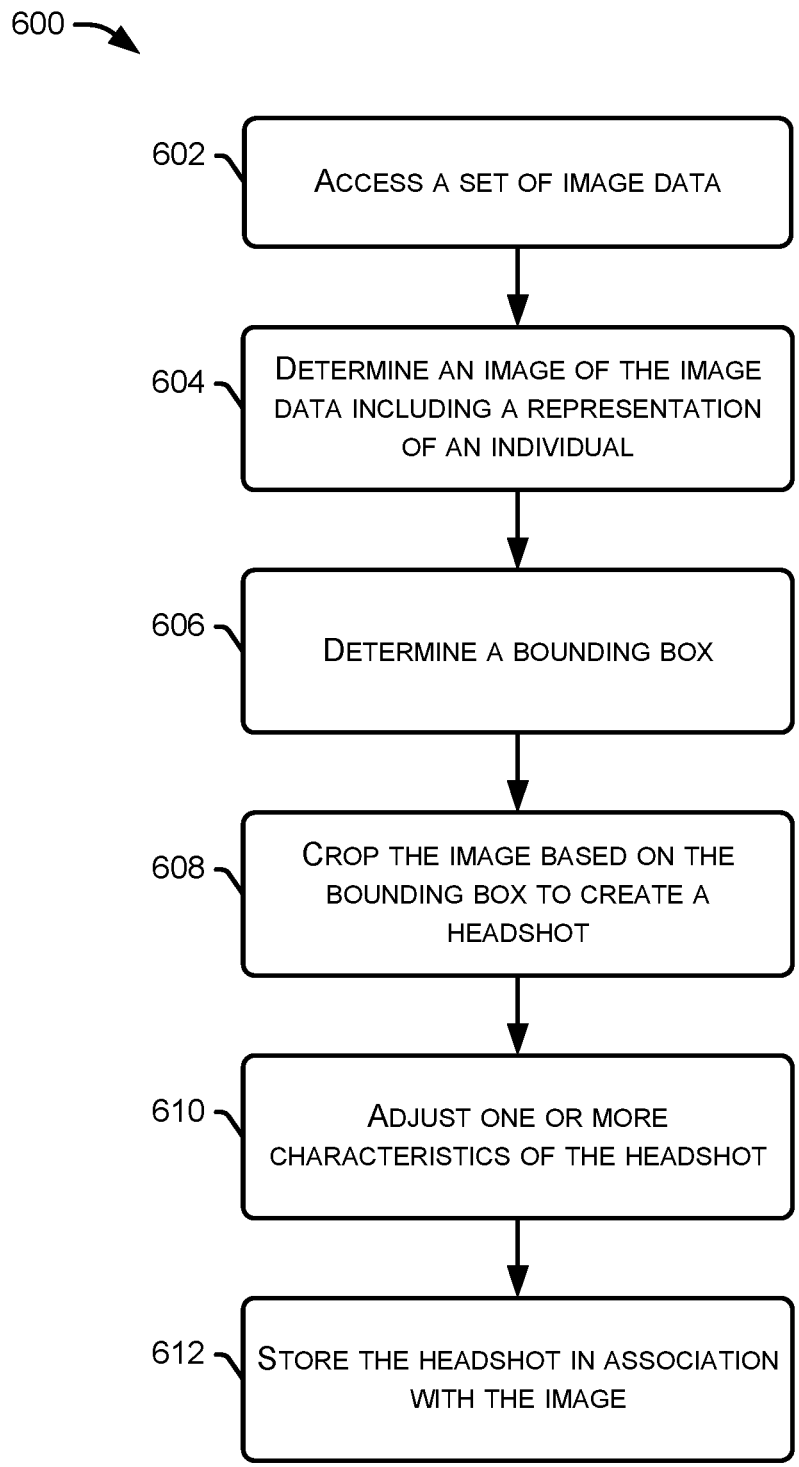
FIG. 6 illustrates an example process for curating headshots of individuals to provide consistent and visually appealing headshots used in identification of individuals, according to the present description.

FIG. 6 illustrates a flow diagram of a method according to the present technology. For simplicity of explanation, the method is depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Any of a variety of other process implementations which would occur to one of ordinary skill in the art, including but not limited to variations or modifications to the process implementations described herein, are also considered to be within the scope of this disclosure.

FIG. 6 illustrates a process 600 for curating headshots of individuals to provide consistent and visually appealing headshots used in identification of individuals, according to the present description. The process 600 may be carried out by a computing system or device, such as the content server 314 of FIG. 3 and/or the computing device 700 of FIG. 7.

At 602, the process 600 includes the computing device accessing a set of image data. The image data may be accessed from a set of images such as a sequence of images in a video or database of existing images. The images may include existing headshots being processes for consistency across a catalog or selection of headshots or other collections of images. In some examples, the image data may be captured in real-time, for example on-board a camera equipped with a headshot curation system to guide capture of headshot images using real-time feedback and input on settings to the camera using the techniques described herein.

At 604, the process 600 includes the computing device determining an image of the image data including a representation of an individual. The computing device may identify a subset of images suitable for headshot generation based on factors such as pose, sharpness, and brightness.

The computing device may initially localize an individual within the images using a face detection algorithm. The face detection algorithm may include any suitable machine learning model trained using labeled faces either to identify particular identities and/or to identify a face within an image that may be identified at a later stage. The images may be selected based on identification of faces and identification of poses and/or other characteristics that lead to a successful headshot. Such characteristics include the entire face of the individual being visible, having a brightness and sharpness above a threshold level, and other such factors that result in clearly visible faces of individuals. After identifying the individual or presence of the individual within the images, the images may have optional characteristics adjusted, for example to change an image tone, brightness, and/or sharpness to improve the resulting headshot.

At 606, the process 600 includes the computing device determining a bounding box. The bounding box 406 may be defined by heuristics in some examples. The heuristics may define features of the resulting headshot cropped by the bounding box. In some instances, the heuristics may include identifying a face within an upper half, as defined by guideline 410 or upper third of the headshot image: centering the face of the individual (e.g., using a face detection 412), according to centerline 414; cropping all or a portion of the hair of the individual (not shown); and including an upper portion of the shoulders of the individual. The upper and lower limits of the bounding box 406 may be established based on the dimensions of the image from the shoulders to the top of the head of the individual. The left and right limits of the bounding box 406 may be defined based on maintaining a particular aspect ratio to the headshot or based on ensuring the shoulders are visible within the headshot or other factors. The resulting bounding box 406, defined using the parameters defined above, may then be used to crop the image to produce the resulting headshot. In some examples, the bounding box may be defined using a machine learning model, such as the MTCNN.

At 608, the process 600 includes the computing device cropping the image based on the bounding box. The image may be cropped based on the dimensions and locations of the bounding box to produce a headshot.

At 610, the process 600 includes the computing device adjusting one or more characteristics of the image. In some examples, the characteristics of the image, brightness, tone, sharpness, alignment, etc., may be evaluated and adjusted, such as described with respect to the appearance module 328 of FIG. 3.

At 612, the process 600 includes the computing device storing the headshot in association with the image. The headshot may be stored with reference to the original image or separate from the original image. The headshot may be stored with a collection of other headshots and associated with an identity of the individual in the headshot for use and access by a user.

Figure 7:
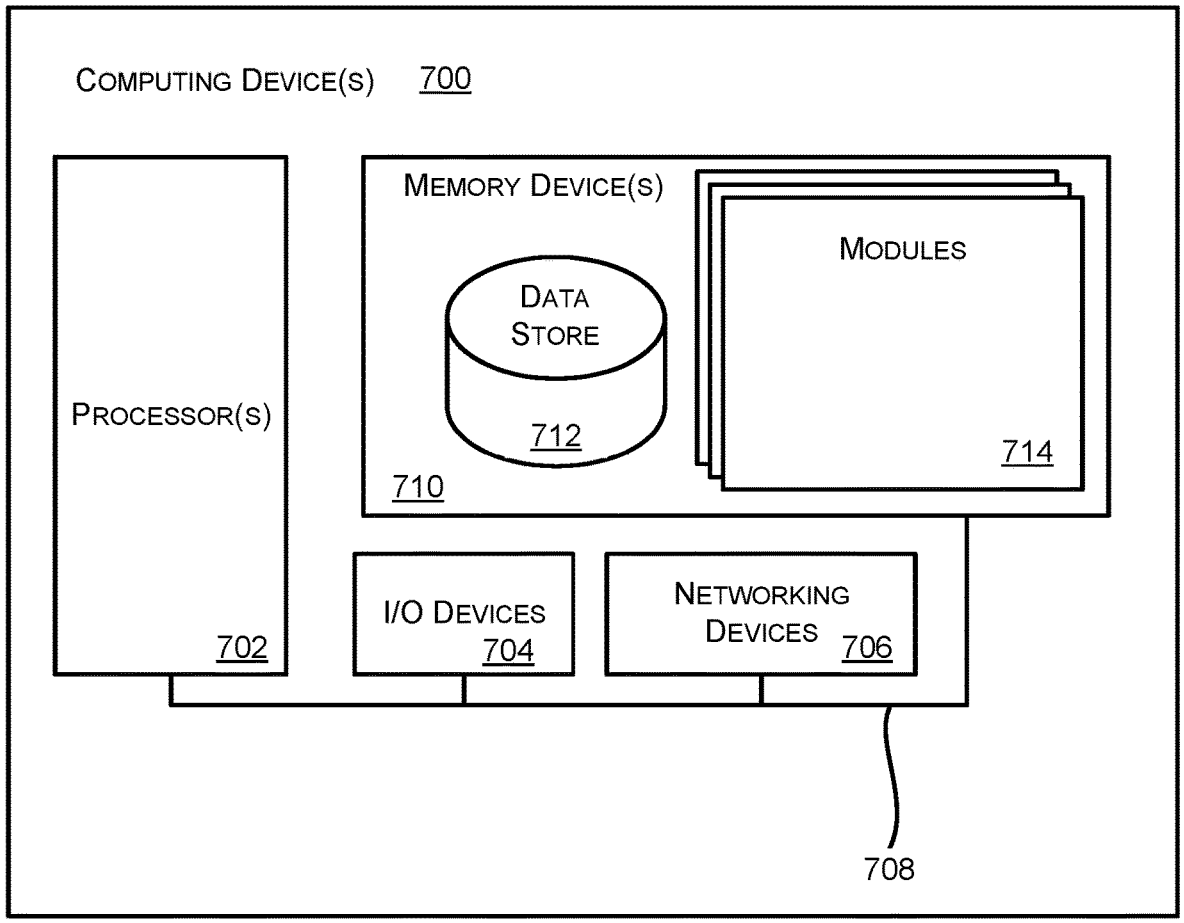
FIG. 7 illustrates a block diagram of a computing system for use in generating and curating headshots, according to the present description.

FIG. 7 illustrates a block diagram of a computing device 700 for use in generating and curating headshots, according to the present description. The computing device 700 may include one or more computing devices on which services or modules of this technology may execute. The computing device 700 is illustrated on which a high-level example of the technology may be executed. The computing device 700 may be an example of the content server 314 of FIG. 3. The computing device 700 may include one or more processors 702 that are in communication with memory devices 710. The computing device 700 may include a local communication interface 708 for the components in the computing device. For example, the local communication interface 708 may be a local data bus and/or any related address or control busses as may be desired.

The memory device 710 may contain modules 714 that are executable by the processor(s) and data for the modules 714. The modules 714 may include the modules shown and described with respect to FIG. 3, among others. A data store 712 may also be located in the memory device 710 for storing data related to the modules and other applications along with an operating system that is executable by the processor 702.

The computing device 700 may further include or be in communication with a client device, which may include a display device. The client device may be available for an administrator to use in interfacing with the computing device 700, such as to review operation of a virtual computing instance, make improvements to machine learning models and so forth.

Various applications may be stored in the memory device 710 and may be executable by the processor 702. Components or modules discussed in this description that may be implemented in the form of software using high programming level languages that are compiled, interpreted or executed using a hybrid of the methods.

The computing device 700 may also have access to I/O (input/output) devices 704 that are usable by the computing devices. An example of an I/O device 704 is a display screen that is available to display output from the computing devices. Other known I/O device may be used with the computing device as desired. Networking devices 706 and similar communication devices may be included in the computing device 700. The networking devices 706 may be wired or wireless networking devices 706 that connect to the internet, a LAN, WAN, or other computing network.

The components or modules that are shown as being stored in the memory device 710 may be executed by the processor 702. The term "executable" may mean a program file that is in a form that may be executed by a processor 702. For example, a program in a higher level language may be compiled into machine code in a format that may be loaded into a random access portion of the memory device 710 and executed by the processor 702, or source code may be loaded by another executable program and interpreted to generate instructions in a random access portion of the memory to be executed by a processor 702. The executable program may be stored in any portion or component of the memory device 710. For example, the memory device 710 may be random access memory (RAM), read only memory (ROM), flash memory, a solid state drive, memory card, a hard drive, optical disk, floppy disk, magnetic tape, or any other memory components.

The processor 702 may represent multiple processors and the memory device 710 may represent multiple memory units that operate in parallel to the processing circuits. This may provide parallel processing channels for the processes and data in the system. The local interface may be used as a network to facilitate communication between any of the multiple processors and multiple memories. The local interface may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology. The computer readable storage medium may, for example, be in the form of a non-transitory computer readable storage medium. As used herein, the terms "medium" and "media" may be interchangeable with no intended distinction of singular or plural application unless otherwise explicitly stated. Thus, the terms "medium" and "media" may each connote singular and plural application.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

It is noted that any of the distributed system implementations described above, or any of their components, may be implemented as one or more web services. In some implementations, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various implementations, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some implementations, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

Reference was made to the examples illustrated in the drawings, and specific language was used herein to describe the same. It will nevertheless be understood that no limitation of the scope of technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features, it is to be understood that the subject matter defined in the appended claims is not necessarily limited to the specific features described. Rather, the specific features are disclosed as illustrative forms of implementing the claims.

The invention claimed is:

1. A method comprising:
   accessing a set of image data from a video source including a representation of one or more individuals;
   for each individual of the one or more individuals:
   determine an image characteristic score reflective of a quality of the representation of the individual within an image of the set of image data;
   determine a pose of the individual using a pose estimation machine learning algorithm, the pose indicative of an estimated direction of a face of the individual related to a direction of an imaging device that captured the set of image data;
   determining the image based on the estimated direction of the face being within a threshold amount of the direction of the imaging device and the image characteristic score being equal to or greater than a threshold amount;
   determining, based on a bounding box location and bounding box dimensions for a headshot of the individual, a bounding box surrounding a head of the individual and the bounding box location and bounding box dimensions defined based on characteristics comprising:
   a location of the face of the individual;
   a size of the face of the individual relative to a height of the bounding box;
   a position of the face of the individual within the bounding box;
   a representation of shoulders of the individual within the bounding box;
   generating the headshot by placing the bounding box at the bounding box location within the image and removing image data lying outside of the bounding box;
   determining an aesthetic score for the headshot, the aesthetic score determined based on an aggregate of scores for a set of aesthetic characteristics;
   adjusting an aesthetic characteristic in response to the aesthetic score being below a first threshold; and
   causing to be presented, via a user interface and in association with the video source, headshots for each individual of the one or more individuals.

2. The method of claim 1, wherein determining the image of the set of image data comprises identifying the pose of the individual using the pose estimation machine learning algorithm, the pose estimation machine learning algorithm configured to receive the set of image data and output the image and a score associated with the estimated direction of the face of the individual related to the direction of the imaging device, the image selected based on the score exceeding a threshold; and
   determining the bounding box for the headshot comprises using a multi-task cascaded convolutional neural network trained using headshot data labeled using heuristics describing head size, head position, and head pose of the headshot.

3. The method of claim 1, wherein determining the image comprises using a pose based heuristic that implements a cost function that determines a cost based on the pose and a size of a head of the individual within the bounding box.

4. The method of claim 1, wherein generating the headshot comprises:
   identifying, in response to the aesthetic score being below the first threshold, an aesthetic characteristic of the set of aesthetic characteristics to adjust, the aesthetic characteristic identified based on the aesthetic score for the aesthetic characteristic being below a second threshold, wherein the set of aesthetic characteristics comprise:
   an image tone;
   a brightness;
   a pose of the individual;
   a background blur; and
   a sharpness of the image.

5. A method for automatically generating professional headshots from source image data, the method comprising:
   accessing a set of image data from a video source including a representation of one or more individuals;
   for each individual of the one or more individuals:
   determining an image of the set of image data based at least in part on a characteristic of the representation of the individual;
   determining a bounding box location and one or more bounding box dimensions for a headshot for the individual, the bounding box surrounding a head of the individual; and
   generating the headshot by:
   determining a frame of the image by cropping the image by placing the bounding box at the bounding box location within the image and removing image data lying outside of the bounding box;
   determining an aesthetic score for the frame, the aesthetic score determined based on an aggregate of scores for a set of aesthetic characteristics; and
   adjusting an aesthetic characteristic in response to the aesthetic score being below a first threshold; and
   causing to be presented, via a user interface and in association with the video source, headshots for each individual of the one or more individuals.

6. The method of claim 5, wherein determining the image of the set of image data comprises localizing the individual within the image of the set of image data using a machine learning algorithm trained using labeled face detection data indicating visibility of faces within images.

7. The method of claim 5, wherein determining the bounding box comprises identifying the bounding box using a machine learning algorithm trained using headshot data labeled using heuristics describing head size, head position, and head pose of the headshot.

8. The method of claim 5, wherein generating the headshot comprises performing one or more aesthetic adjustments to the image.

9. The method of claim 8, wherein the one or more aesthetic adjustments include at least one of:
an image tone adjustment; a brightness adjustment;
a pose correction;
a background blur adjustment; or
a sharpness adjustment of the image.

10. The method of claim 5, wherein determining the image is based at least in part on the image including the individual unobscured in a portion of the image.

11. The method of claim 5, further comprising storing the headshot in association with the set of image data; and
accessing, by a user on a computing device viewing a video including the set of image data, the headshot by pausing the video to view the image and accessing an informational panel describing one or more individuals within the image with the headshot.

12. The method of claim 5, wherein determining the image comprises selecting the image based at least in part on a pose of the individual within the image.

13. The method of claim 12, wherein selecting the image based at least in part on the pose of the individual comprises determining a head pose estimation for the individual using a machine learning model, wherein the image is selected in response to the pose indicating a forward-facing head pose estimation.

14. The method of claim 5, wherein determining the bounding box is based at least in part on a set of heuristics comprising:
a head of the individual being centered within the bounding box;
the head of the individual being in an upper half of the bounding box; and
shoulders of the individual being included within the bounding box.

15. A non-transitory computer-readable medium having instructions stored thereon that, when executed by one or more processors, cause the one or more processors to perform operation comprising:
accessing a set of image data from a video source including a representation of one or more individuals;
for each individual of the one or more individuals:
determining an image of the set of image data based at least in part on a characteristic of the representation of the individual;
determining a bounding box location and one or more bounding box dimensions for a headshot for the individual, the bounding box surrounding a head of the individual; and
generating the headshot by:
determining a frame of the image by placing the bounding box at the bounding box location within the image and removing image data lying outside of the bounding box;
determining an aesthetic score for the frame, the aesthetic score determined based on an aggregate of scores for a set of aesthetic characteristics; and
adjusting an aesthetic characteristic in response to the aesthetic score being below a first threshold; and
causing to be presented, via a user interface and in association with the video source, headshots for each individual of the one or more individuals.

16. The non-transitory computer-readable medium of claim 15, wherein determining the image comprises selecting the image based at least in part on a pose of the individual within the image.

17. The non-transitory computer-readable medium of claim 16, wherein determining the image based at least in part on the pose of the individual comprises using a pose based heuristic that implements a cost function that determines a cost based at least in part on the pose and a size of a head of the individual within the bounding box.

18. The non-transitory computer-readable medium of claim 15, wherein determining the bounding box comprises identifying the bounding box using a machine learning algorithm trained using headshot data labeled using heuristics describing head size, head position, and head pose of the individual.

19. The non-transitory computer-readable medium of claim 15, further comprising determining an aesthetic score for the headshot and performing an aesthetic adjustment in response to the aesthetic score being below a threshold.

20. The non-transitory computer-readable medium of claim 15, further comprising storing the headshot in association with the set of image data for access by a user viewing the set of image data.

* * * * *